Nov. 24, 1942.  A. ROOT  2,302,803
INSECT DESTROYER
Filed March 13, 1941  3 Sheets-Sheet 1

Inventor
Adolphus Root
By Clarence A. O'Brien
Attorney

Nov. 24, 1942.   A. ROOT   2,302,803
INSECT DESTROYER
Filed March 13, 1941   3 Sheets-Sheet 2
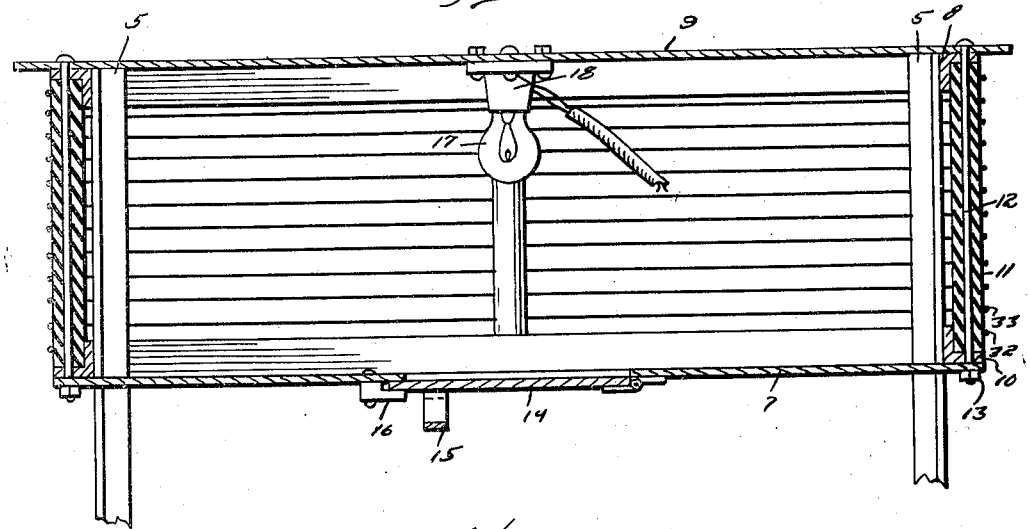
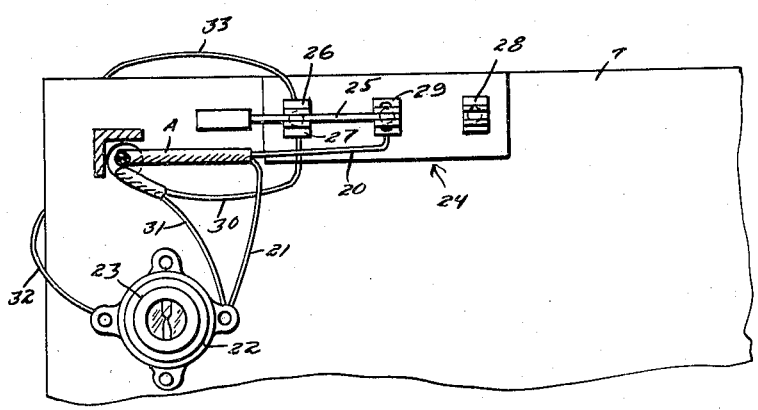
Inventor
Adolphus Root
By Clarence A. O'Brien
Attorney Nov. 24, 1942.  A. ROOT  2,302,803
INSECT DESTROYER
Filed March 13, 1941  3 Sheets—Sheet 3

Inventor
Adolphus Root

By *Clarence A. O'Brien*

Attorney

Patented Nov. 24, 1942

2,302,803

UNITED STATES PATENT OFFICE 2,302,803

INSECT DESTROYER

Adolphus Root, Wheeler, Mich., assignor of one-half to C. W. Lanshaw, Wheeler, Mich.

Application March 13, 1941, Serial No. 383,221

1 Claim. (Cl. 43—112)

This invention relates to new and useful improvements in insect destroyers and more particularly to a device for attracting and executing corn borers and various other crop destructive insects.

The principal object of the present invention is to provide an apparatus whereby insects will be attracted from growing crops and which will serve to electrically execute insects when they come in contact with the exposed electrical conductor elements thereof.

Another important object of the invention is to provide a device of the character stated which can be readily set up and which will be substantially foolproof in operation.

These and various other important objects and advantages of the invention will become apparent to the reader of the following specification.

In the drawings:

Figure 3 is a fragmentary vertical sectional view through the intermediate portion of the apparatus, taken substantially on the line 3—3 of Figure 1.

Figure 4 is a horizontal sectional view taken substantially on the line 4—4 of Figure 1, looking in an upward direction.

Figure 6 is a diagrammatic view showing the positive and negative conductors.

Figure 1:
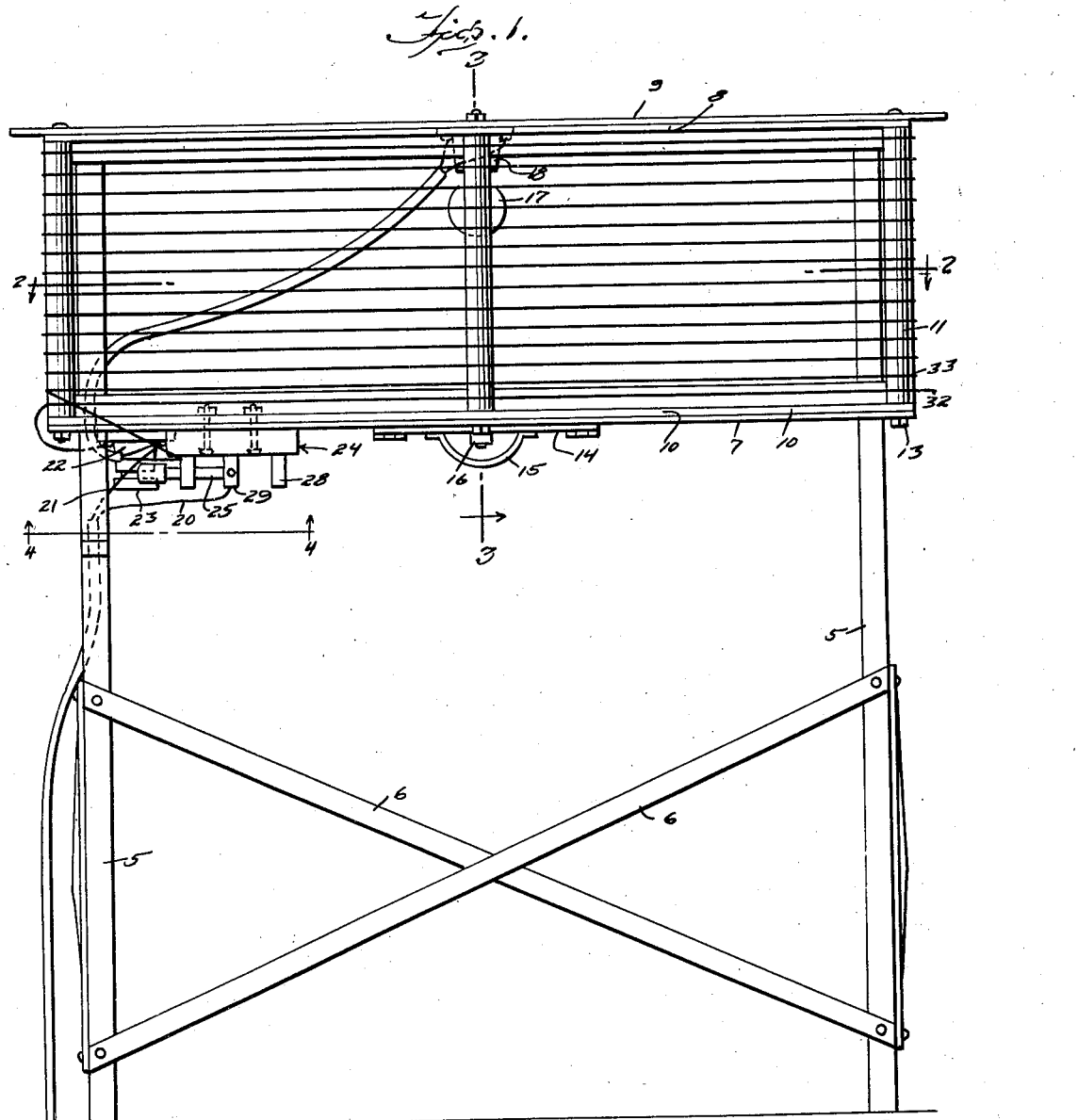
Figure 1 represents a side elevational view of the apparatus.

Referring to the drawings wherein like numerals designate like parts, it can be seen that the device has four or more leg members 5 preferably of angle iron. The lower portions of these legs 5 are braced by crossed bars 6 suitably secured to the legs.

Figure 2:
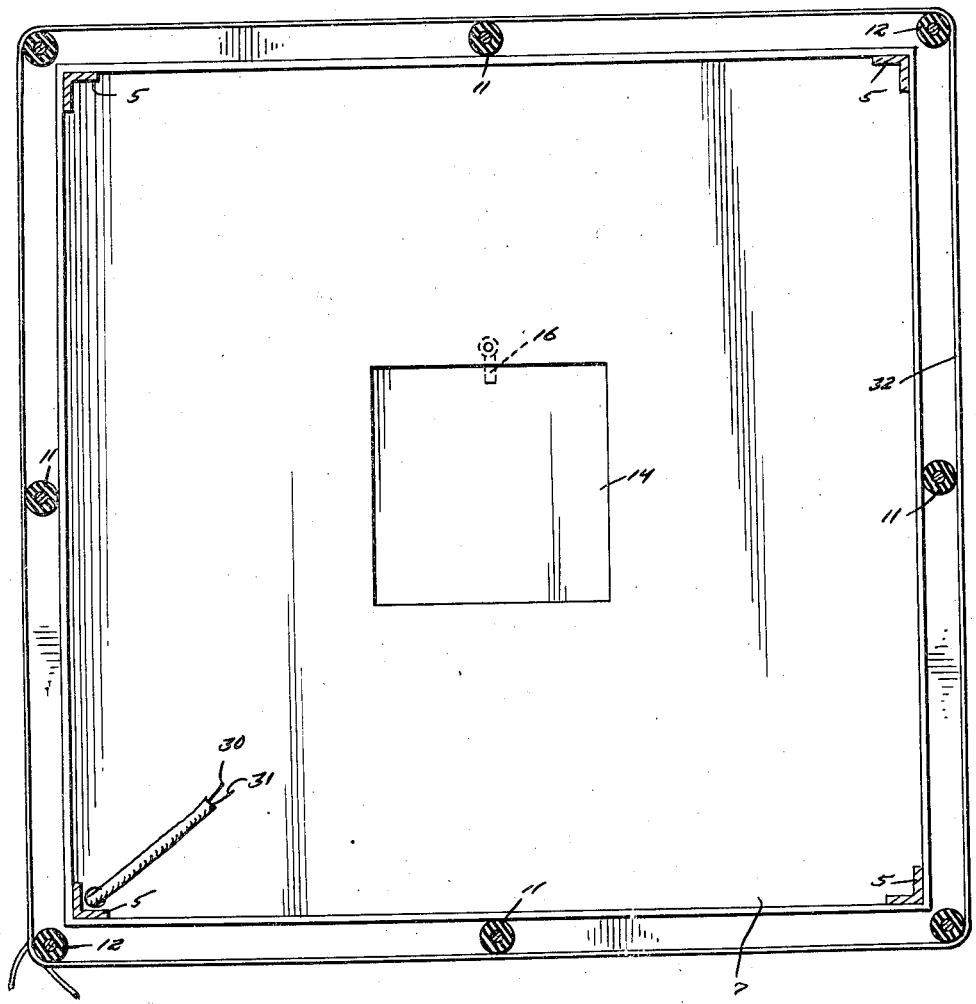
Figure 2 is a horizontal sectional view on the line 2—2 of Figure 1.
Figure 5:
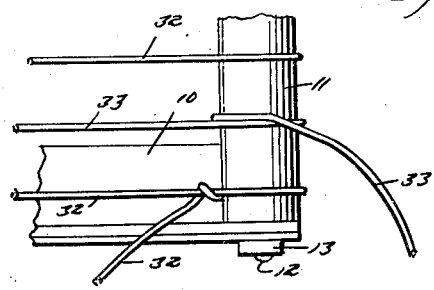
Figure 5 is a fragmentary side elevational view showing one corner of the executing apparatus.

Numeral 7 denotes a platform upwardly through the corner portions of which the legs 5 project for a substantial distance. The upper ends of the legs 5 are bridged by angle members, 8, and to the outwardly disposed flanges thereof a cover plate or roof 9 is secured. At the edge portions of the platform 7 extend angle members 10 having outwardly disposed flanges and interposed between the outstanding flanges of the angle members 8 and the angle members 10 are vertically disposed tubes 11 of insulation through which tie rods 12 extend. These tie rods extend downwardly through openings in the roof 9, angle members 8, tubes 11, angle members 10 and the edge portions of the platform 7, where the rods 12 are threaded and equipped with nuts 13. These tubes 11 of insulation can be arranged at the corners of the platform 7 and at intermediate points along the sides thereof as suggested in Figure 2.

The platform 7 has an opening in the central portion thereof which is normally closed by a hinged door 14 having a handle 15. A pivotal latch 16 is employed to normally maintain the door 14 closed.

When the door 14 is opened, access can be had to a bulb 17 mounted in a socket 18, the latter being secured to the underside of the roof 9.

A denotes an electric cord having a plug B through which extends positive and negative wires 20 and 21. Secured to the bottom side of the platform 7 is a fuse socket 22 containing a fuse 23. A switch generally referred to by numeral 24 is mounted on the bottom of the platform 7 and has a switch blade 25 which is engageable with contacts 26, 27 or with a dead contact 28. The blade 25 has a pivotal mount 29 to which the positive wire 20 of the cord A connects. Numeral 30 denotes a wire extending from the contact 27 to one side of the lamp socket 18, while numeral 31 denotes a conductor wire extending from the other side of the lamp socket 18 to one side of the fuse socket 22. A conductor 32 extends from the other side of the fuse socket, is bared and is disposed upwardly and trained horizontally around the cage formed of the upright posts 11. A bare conductor wire 33 extends upwardly from the contact 26 and is also trained around the tubes 11 between the bare conductor wires 32. The wires 32 and 33 as they are trained about the tubes 11 are in close parallel spaced relation just far enough apart to permit a given insect to squeeze itself between. Obviously as the insect contacts opposed wires 32 and 33 a charge of electricity will pass through its body sufficient to kill it. It is submitted that a charge of electricity sufficient to kill an insect would only be mildly noticed by a human being, so, therefore, the apparatus would not be dangerous to humans.

The apparatus is particularly used at night when corn borers do their devastating work and the purpose of the lamp 17 is to attract these insects to the apparatus.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In a device of the class described, a pair of upper and lower rectangular plates vertically spaced apart and parallel, corner posts supporting said plates and extending through the lower plate to said upper plate, said plates extending outwardly beyond said posts to provide upper and lower ledges around the same, a pair of upper and lower rectangular frames surrounding said posts and extending laterally therefrom along the upper and lower ledges, respectively, between the same, upright corner sleeves of insulation fitting between said frames outwardly of said posts, tie rods extending through said ledges, frames and sleeves to secure the plates, frames and sleeves in clamped together relation, and grid forming wires extending between said sleeves and trained around the same.

ADOLPHUS ROOT.